(12) United States Patent
Wang et al.

(10) Patent No.: US 12,407,944 B2
(45) Date of Patent: Sep. 2, 2025

(54) IMAGE PROCESSING METHOD AND ELECTRONIC DEVICE

(71) Applicant: Honor Device Co., Ltd., Shenzhen (CN)

(72) Inventors: Ning Wang, Shenzhen (CN); Bin Chen, Shenzhen (CN); Xiangrui Zeng, Shenzhen (CN); Yu Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 15 days.

(21) Appl. No.: 18/009,858

(22) PCT Filed: Aug. 24, 2022

(86) PCT No.: PCT/CN2022/114535
§ 371 (c)(1),
(2) Date: Dec. 12, 2022

(87) PCT Pub. No.: WO2023/030135
PCT Pub. Date: Mar. 9, 2023

(65) Prior Publication Data
US 2024/0107182 A1   Mar. 28, 2024

(30) Foreign Application Priority Data

Sep. 3, 2021   (CN) .......................... 202111034292.7
Nov. 3, 2021   (CN) .......................... 202111294313.9

(51) Int. Cl.
*H04N 23/84*   (2023.01)
*G06T 3/4015*   (2024.01)
(Continued)

(52) U.S. Cl.
CPC ......... *H04N 23/843* (2023.01); *G06T 3/4015* (2013.01); *H04N 5/77* (2013.01);
(Continued)

(58) Field of Classification Search
CPC ........ H04N 23/843; H04N 5/77; H04N 23/62; H04N 23/632; H04N 23/667;
(Continued)

(56) References Cited

U.S. PATENT DOCUMENTS 7,218,344 B2 * 5/2007 Cooper ................ H04N 1/6027
382/167
9,210,391 B1   12/2015 Mills
(Continued)

FOREIGN PATENT DOCUMENTS

CN   101796843 A   8/2010
CN   107924554 A   4/2018
(Continued)

*Primary Examiner* — Michael S Osinski
(74) *Attorney, Agent, or Firm* — Leydig, Voit & Mayer, Ltd.

(57) ABSTRACT

An image processing method and an electronic device are provided. The image processing method includes: displaying a first interface, where the first interface includes a first control; detecting a first operation on the first control; obtaining a first image stream in response to the first operation, where the first image stream is an image stream of first color space; converting the first image stream into a second image stream of second color space according to a demosaicing algorithm; performing downsampling and resampling on the second image stream to obtain a third image stream, where the third image stream is an image stream of the first color space, and a size of the third image stream is less than that of the first image stream; and performing image processing on the third image stream to obtain a fourth image stream.

20 Claims, 14 Drawing Sheets

(51) Int. Cl.
  *H04N 5/77* (2006.01)
  *H04N 23/62* (2023.01)
  *H04N 23/63* (2023.01)
  *H04N 23/667* (2023.01)

(52) U.S. Cl.
  CPC ........... H04N 23/62 (2023.01); H04N 23/632 (2023.01); H04N 23/667 (2023.01)

(58) Field of Classification Search
  CPC ............... H04N 23/651; H04N 23/633; H04N 23/6812; H04N 23/815; H04N 5/00; H04N 5/76; H04N 7/14; H04N 23/683; H04N 23/81; H04N 23/85; H04N 23/95; H04N 25/10; H04N 23/80; H04N 23/84; H04N 25/133; G06T 3/4015; G06T 2207/10024; G06T 5/20; G06T 7/90; G06T 5/50; G09G 2320/0666; G09G 2300/0452
  See application file for complete search history.

(56) References Cited

U.S. PATENT DOCUMENTS

| | | | |
|---|---|---|---|
| 9,219,870 B1 | 12/2015 | Mills et al. | |
| 9,697,796 B2* | 7/2017 | Darshan | G06T 3/40 |
| 9,911,174 B2 | 3/2018 | Lim et al. | |
| 10,715,816 B2* | 7/2020 | Tourapis | H04N 19/61 |
| 11,847,759 B2* | 12/2023 | Okamura | G06T 3/4015 |
| 12,022,205 B2* | 6/2024 | Jang | G06T 5/20 |
| 2007/0153020 A1* | 7/2007 | Inoue | H04N 1/6019 |
| | | | 345/591 |
| 2010/0208989 A1 | 8/2010 | Narroschke et al. | |
| 2011/0052070 A1* | 3/2011 | Nakagomi | G06V 10/25 |
| | | | 382/190 |
| 2011/0058747 A1* | 3/2011 | Nakagomi | G06F 18/253 |
| | | | 382/195 |
| 2013/0004071 A1* | 1/2013 | Chang | H04N 25/671 |
| | | | 382/167 |
| 2013/0051665 A1* | 2/2013 | Shinozaki | G06T 5/00 |
| | | | 382/167 |
| 2013/0114000 A1* | 5/2013 | Atkins | H04N 5/20 |
| | | | 348/708 |
| 2013/0322746 A1 | 12/2013 | Cote et al. | |
| 2014/0132715 A1* | 5/2014 | Raghoebardayal | A63F 13/212 |
| | | | 348/43 |
| 2015/0296193 A1 | 10/2015 | Cote et al. | |
| 2016/0037073 A1 | 2/2016 | Mills et al. | |
| 2016/0110843 A1 | 4/2016 | Mills et al. | |
| 2016/0284314 A1 | 9/2016 | Darshan et al. | |
| 2017/0134731 A1 | 5/2017 | Tourapis et al. | |
| 2018/0293704 A1* | 10/2018 | Tokizaki | G06T 5/00 |
| 2018/0300935 A1* | 10/2018 | Imai | G06T 11/60 |
| 2018/0315172 A1 | 11/2018 | Smirnov et al. | |
| 2020/0051209 A1* | 2/2020 | Smirnov | G06T 5/20 |
| 2021/0134326 A1* | 5/2021 | Liu | G11B 27/005 |
| 2022/0182590 A1* | 6/2022 | Cho | G06T 3/4015 |
| 2022/0189029 A1* | 6/2022 | Mequanint | G06T 7/194 |
| 2023/0177746 A1* | 6/2023 | Shao | G16H 50/20 |
| | | | 382/131 |
| 2023/0269496 A1* | 8/2023 | Yang | H04N 25/10 |

FOREIGN PATENT DOCUMENTS

| | | |
|---|---|---|
| CN | 111402146 A | 7/2020 |
| CN | 111741277 A | 10/2020 |
| CN | 112261391 A | 1/2021 |
| CN | 112381102 A | 2/2021 |
| CN | 113487528 A | 10/2021 |
| JP | 201535775 A | 2/2015 |
| JP | 201682452 A | 5/2016 |
| KR | 1020070069890 A | 7/2007 |

* cited by examiner

IMAGE PROCESSING METHOD AND ELECTRONIC DEVICE

CROSS-REFERENCE TO RELATED APPLICATIONS

This application is a national stage of International Application No. PCT/CN2022/114535, filed on Aug. 24, 2022, which claims priority to Chinese Patent Application No. 202111034292.7, filed on Sep. 3, 2021, and Chinese Patent Application No. 202111294313.9, filed on Nov. 3, 2021. The disclosures of each of the aforementioned application are hereby incorporated by reference in their entireties.

TECHNICAL FIELD

This application relates to the field of image processing, and specifically, to an image processing method and an electronic device.

BACKGROUND

When a video is shot in a dark environment, for example, when a video is recorded at night, noise of the video is relatively large because an amount of entering light is relatively small. To reduce the noise in the video and improve image quality of the video, raw-domain denoising is usually performed for an image in the video. Because operation performance and power consumption of an electronic device are limited, a size of the image needs to be reduced when raw-domain denoising is performed. However, a current method for reducing a size of an image when raw-domain denoising is performed has a problem of reducing definition of the image or destroying a Bayer structure of the image.

Therefore, when operation performance and power consumption of an electronic device are limited, how to perform image processing to ensure quality of an image in a video becomes an urgent problem to be resolved.

SUMMARY

This application provides an image processing method and an electronic device, to improve quality of an image in a video in a case that operation performance and power consumption of an electronic device are limited.

According to a first aspect, an image processing method is provided, including:
  displaying a first interface, where the first interface includes a first control;
  detecting a first operation on the first control;
  obtaining a first image stream in response to the first operation, where the first image stream is an image stream of first color space;
  converting the first image stream into a second image stream of second color space according to a demosaicing algorithm;
  performing downsampling and resampling on the second image stream to obtain a third image stream, where the third image stream is an image stream of the first color space, and a size of the third image stream is less than that of the first image stream; and
  performing image processing on the third image stream to obtain a fourth image stream.

In this embodiment of this application, an obtained raw-domain image stream is converted into an RGB-domain image stream (or a YUV-domain image stream), downsampling and resampling are performed on an image in the RGB-domain image stream to obtain a size-reduced raw-domain image stream, and image processing is performed on the size-reduced raw-domain image stream to obtain a processed image stream. Downsampling is performed by using the RGB-domain image stream when a size of the image stream is reduced. Therefore, image definition is not affected when the image size is reduced. In addition, performing downsampling on the RGB-domain image stream does not destroy a Bayer structure of the image, so that a pseudo color in the image can be effectively avoided. Therefore, according to the image processing method in this embodiment of this application, in a case that operation performance and power consumption of an electronic device are limited, quality of an image in a video can be improved.

It should be further understood that the raw-domain image stream is an image stream of raw color space, and the raw-domain image stream means that the image stream is in the raw color space. Similarly, the RGB-domain image stream is an image stream of RGB color space, that is, the image stream is in the RGB color space. The YUV-domain image stream is an image stream of YUV color space, that is, the image stream is in the YUV color space.

In a possible implementation, the first color space refers to a raw domain, and the second color space includes an RGB domain or a YUV domain.

With reference to the first aspect, in some implementations of the first aspect, the first interface is a home screen of an electronic device, the home screen includes a camera application, and the first control is a control corresponding to the camera application.

In a possible implementation, the first operation is an operation of tapping the camera application.

With reference to the first aspect, in some implementations of the first aspect, the first interface is a video recording interface, and the first control is a control used to indicate video recording.

In a possible implementation, the first operation is an operation of tapping the control used to indicate video recording.

With reference to the first aspect, in some implementations of the first aspect, the first interface is a video call interface, and the first control is a control used to indicate video calling.

In a possible implementation, the first operation is an operation of tapping the control used to indicate video calling.

The foregoing provides description by using an example in which the first operation is a tap operation. The first operation may alternatively include a voice indication operation or another operation for indicating the electronic device to record a video or make a video call. The foregoing is an example for description, and constitutes no limitation on this application.

With reference to the first aspect, in some implementations of the first aspect, the image processing includes processing according to an algorithm of the first color space, and the algorithm of the first color space includes at least one of the following algorithms:
  a denoising algorithm, a super-resolution algorithm, or a deblurring algorithm. In a possible implementation, the image processing further includes image processing performed by an image signal processor. For example, the image processing may further include an image processing process such as black level correction, lens shading correction, auto white balance, or demosaicing.

With reference to the first aspect, in some implementations of the first aspect, the method further includes:
storing the fourth image stream, where the fourth image stream is used for playback.

With reference to the first aspect, in some implementations of the first aspect, the fourth image stream is a preview image stream.

With reference to the first aspect, in some implementations of the first aspect, the electronic device includes a camera algorithm library, the camera algorithm library is set at a hardware abstraction layer, and the camera algorithm library includes an algorithm used for the downsampling, an algorithm used for the resampling, or the algorithm of the first color space.

In this embodiment of this application, the algorithm for the downsampling, the algorithm for the resampling, or the algorithm of the first color space may be an algorithm in the camera algorithm library. In other words, hardware in the electronic device may not need to be greatly changed, and the image processing method in this embodiment of this application is implemented by using the algorithm in the camera algorithm library, to improve image quality.

With reference to the first aspect, in some implementations of the first aspect, the method further includes:
detecting a second operation, where the second operation is used to indicate to enable a night mode of the electronic device, and the night mode is a photographing mode in which an amount of entering light of the electronic device is less than a preset threshold.

In this embodiment of this application, when the electronic device records a video in a dark scenario, a user may enable the night mode of the electronic device, to run the image processing method provided in this embodiment of this application, thereby improving a denoising effect of an image and improving image quality.

According to a second aspect, an electronic device is provided, including a module/unit configured to perform the first aspect or any method in the first aspect.

According to a third aspect, an electronic device is provided. The electronic device includes one or more processors, a memory, and a display. The memory is coupled to the one or more processors, the memory is configured to store computer program code, the computer program code includes computer instructions, and the one or more processors invoke the computer instructions to enable the electronic device to perform the following operations: displaying a first interface, where the first interface includes a first control; detecting a first operation on the first control; obtaining a first image stream in response to the first operation, where the first image stream is an image stream of first color space; converting the first image stream into a second image stream of second color space according to a demosaicing algorithm; performing downsampling and resampling on the second image stream to obtain a third image stream, where the third image stream is an image stream of the first color space, and a size of the third image stream is less than that of the first image stream; and performing image processing on the third image stream to obtain a fourth image stream.

With reference to the third aspect, in some implementations of the third aspect, the image processing includes processing according to an algorithm of the first color space, and the algorithm of the first color space includes at least one of the following algorithms:
a denoising algorithm, a super-resolution algorithm, or a deblurring algorithm.

With reference to the third aspect, in some implementations of the third aspect, the one or more processors invoke the computer instructions to enable the electronic device to perform the following operation:
storing the fourth image stream, where the fourth image stream is used for playback.

With reference to the third aspect, in some implementations of the third aspect, the fourth image stream is a preview image stream.

With reference to the third aspect, in some implementations of the third aspect, the electronic device includes a camera algorithm library, the camera algorithm library is set at a hardware abstraction layer, and the camera algorithm library includes an algorithm used for the downsampling, an algorithm used for the resampling, or the algorithm of the first color space.

With reference to the third aspect, in some implementations of the third aspect, the one or more processors invoke the computer instructions to enable the electronic device to perform the following operation:
detecting a second operation, where the second operation is used to indicate to enable a night mode of the electronic device, and the night mode is a photographing mode in which an amount of entering light of the electronic device is less than a preset threshold.

With reference to the third aspect, in some implementations of the third aspect, the first interface is a home screen of the electronic device, the home screen includes a camera application, and the first control is a control corresponding to the camera application.

With reference to the third aspect, in some implementations of the third aspect, the first interface is a video recording interface, and the first control is a control used to indicate video recording.

With reference to the third aspect, in some implementations of the third aspect, the first interface is a video call interface, and the first control is a control used to indicate video calling.

According to a fourth aspect, an electronic device is provided. The electronic device includes one or more processors and a memory. The memory is coupled to the one or more processors. The memory is configured to store computer program code. The computer program code includes computer instructions. The one or more processors invoke the computer instructions to enable the electronic device to perform any image processing method in the first aspect.

According to a fifth aspect, a chip system is provided. The chip system is applied to an electronic device, the chip system includes one or more processors, and the processor is configured to invoke computer instructions to enable the electronic device to perform any image processing method in the first aspect.

According to a sixth aspect, a computer-readable storage medium is provided. The computer-readable storage medium stores computer program code. When the computer program code is run by an electronic device, the electronic device is enabled to perform any image processing method in the first aspect.

According to a seventh aspect, a computer program product is provided. The computer program product includes computer program code. When the computer program code is run by an electronic device, the electronic device is enabled to perform any image processing method in the first aspect.

In embodiments of this application, an obtained raw-domain image stream is converted into an RGB-domain image stream (or a YUV-domain image stream), downsampling and resampling are performed on an image in the RGB-domain image stream to obtain a size-reduced raw-domain image stream, and image processing is performed on the size-reduced raw-domain image stream to obtain a processed image stream. Downsampling is performed by using the RGB-domain image stream when a size of the image stream is reduced. Therefore, image definition is not affected when the image size is reduced. In addition, performing downsampling on the RGB-domain image stream does not destroy a Bayer structure of the image, so that a pseudo color in the image can be effectively avoided. Therefore, according to the image processing method in embodiments of this application, in a case that operation performance and power consumption of an electronic device are limited, quality of an image in a video can be improved.

DESCRIPTION OF EMBODIMENTS

The following describes the technical solutions in embodiments of this application with reference to the accompanying drawings.

The following terms "first", "second", "third", and "fourth" are merely used for description, but should not be understood as indicating or implying relative importance or implying a quantity of indicated technical features.

Figure 1:
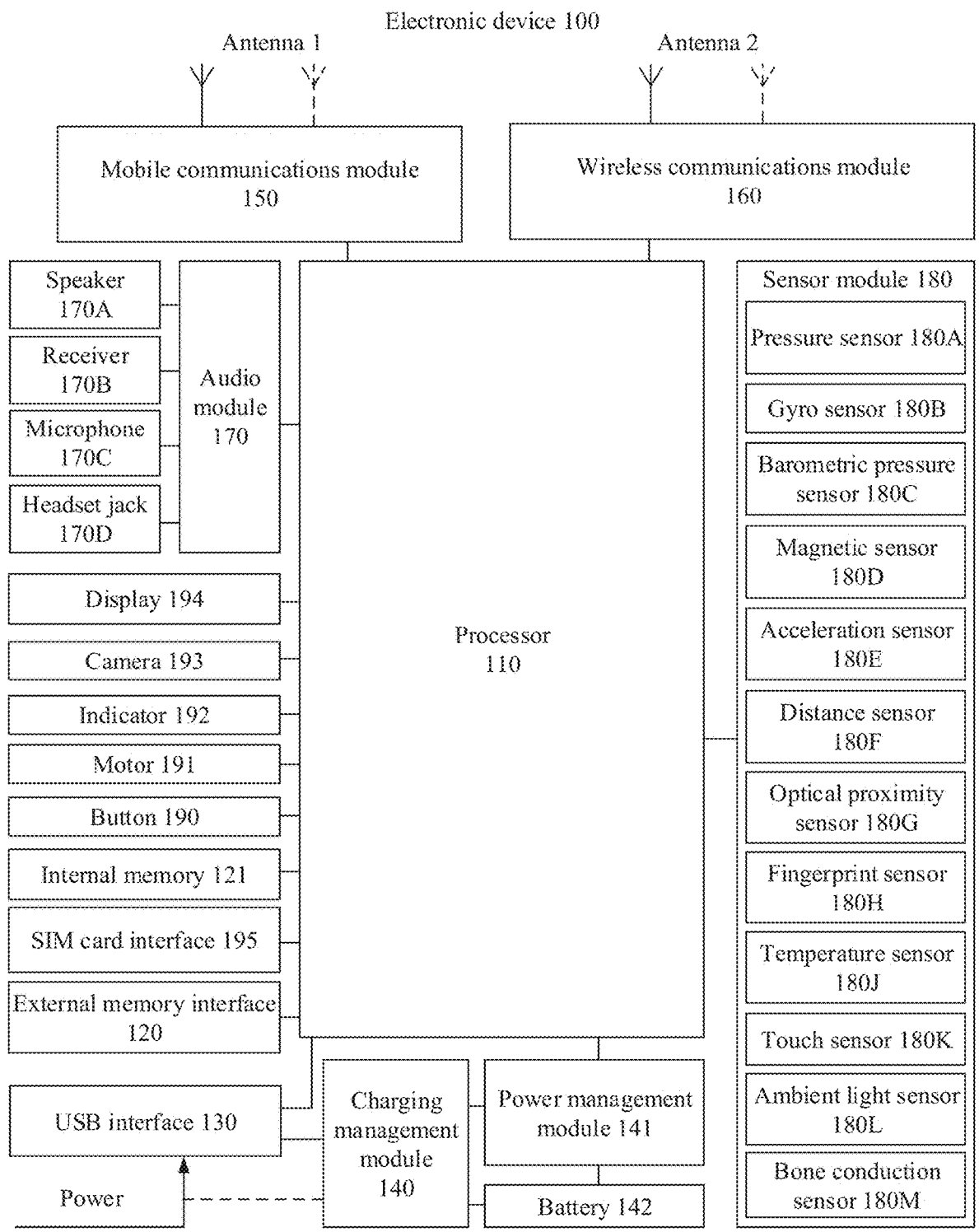
FIG. 1 is a schematic diagram of a hardware system of an electronic device applicable to this application.

FIG. 1 shows a hardware system of an electronic device applicable to this application.

The electronic device 100 may be a mobile phone, a smart screen, a tablet computer, a wearable electronic device, a vehicle-mounted electronic device, an augmented reality (AR) device, a virtual reality (VR) device, a notebook computer, an ultra-mobile personal computer (UMPC), a netbook, a personal digital assistant (PDA), a projector, or the like. A specific type of the electronic device 100 is not limited in embodiments of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 1 does not constitute a specific limitation on the electronic device 100. In some other embodiments of this application, the electronic device 100 may include more or fewer components than the components shown in FIG. 1, or the electronic device 100 may include a combination of some components in the components shown in FIG. 1, or the electronic device 100 may include sub-components of some components in the components shown in FIG. 1. The components shown in FIG. 1 may be implemented by hardware, software, or a combination of software and hardware.

The processor 110 may include one or more processing units. For example, the processor 110 may include at least one of the following processing units: an application processor (AP), a modem processor, a graphics processing unit (GPU), an image signal processor (ISP), a controller, a video codec, a digital signal processor (DSP), a baseband processor, and a neural-network processing unit (NPU). Different processing units may be independent components, or may be an integrated component.

The controller may generate an operation control signal based on instruction operation code and a time sequence signal, to complete control of instruction fetching and instruction execution.

A memory may further be disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

In embodiments of this application, the processor 110 may perform the following operations: displaying a first interface, where the first interface includes a first control; detecting a first operation on the first control; obtaining a first image stream in response to the first operation, where the first image stream is an image stream of first color space; converting the first image stream into a second image stream of second color space according to a demosaicing algorithm; performing downsampling and resampling on the second image stream to obtain a third image stream, where the third image stream is an image stream of the first color space, and a size of the third image stream is less than that of the first image stream; and performing image processing on the third image stream to obtain a fourth image stream.

The connection relationship between the modules shown in FIG. 1 is merely a schematic description, and does not constitute a limitation on the connection relationship between the modules of the electronic device 100. Optionally, the modules of the electronic device 100 may alternatively use a combination of a plurality of connection manners in the foregoing embodiment.

A wireless communication function of the electronic device 100 may be implemented by using components such as the antenna 1, the antenna 2, the mobile communications module 150, the wireless communications module 160, the modem processor, and the baseband processor.

The antenna 1 and the antenna 2 are configured to transmit and receive electromagnetic wave signals. Each antenna in the electronic device 100 may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The electronic device 100 may implement a display function by using the GPU, the display 194, and the application processor. The GPU is a microprocessor for image processing, and is connected to the display 194 and the application processor. The GPU is configured to perform mathematical and geometric calculation and render graphics. The processor 110 may include one or more GPUs that execute program instructions to generate or change display information.

The display 194 may be configured to display an image or a video.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may perform algorithm optimization on noise, brightness, and a color of an image, and the ISP may further optimize parameters such as exposure and a color temperature in a photographing scenario. In some embodiments, the ISP may be disposed in the camera 193.

The camera 193 is configured to capture a still image or a video. An optical image of an object is generated by using a lens and projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as red green blue (RGB) or YUV. In some embodiments, the electronic device 100 may include one or N cameras 193, where N is a positive integer greater than 1.

In embodiments of this application, the camera 193 may obtain a first image stream.

The digital signal processor is configured to process a digital signal. In addition to processing the digital image signal, the digital signal processor may further process another digital signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. In this way, the electronic device 100 may play or record videos in a plurality of coding formats, for example, moving picture experts group (MPEG)-1, MPEG-2, MPEG-3, and MPEG-4.

The gyro sensor 180B may be configured to determine a motion gesture of the electronic device 100. In some embodiments, angular velocities of the electronic device 100 around three axes (that is, the x-axis, the y-axis, and the z-axis) may be determined by using the gyro sensor 180B. The gyro sensor 180B may be used for image stabilization during photographing. For example, when a shutter is pressed, the gyro sensor 180B detects a jittering angle of the electronic device 100, calculates, based on the angle, a distance for which a lens module needs to compensate, and enables the lens to offset jittering of the electronic device 100 through reverse motion, to implement image stabilization. The gyro sensor 180B may be further used in a navigation scenario, a motion-controlled gaming scenario, and the like.

For example, in embodiments of this application, the gyro sensor 180B may be configured to collect jitter information, and the jitter information may be used to indicate a pose change of the electronic device in a photographing process.

The acceleration sensor 180E may detect values of acceleration of the electronic device 100 in all directions (usually on the x-axis, the y-axis, and the z-axis). When the electronic device 100 is static, the acceleration sensor 180E may detect magnitude and a direction of gravity. The acceleration sensor 180E may be further configured to recognize a posture of the electronic device 100 as an input parameter of an application such as switching between landscape mode and portrait mode and a pedometer.

The distance sensor 180F is configured to measure a distance. The electronic device 100 may measure a distance through infrared or laser. In some embodiments, for example, in a photographing scenario, the electronic device 100 may measure a distance by using the distance sensor 180F, to implement quick focusing.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement functions such as unlocking, application lock access, photographing, call answering, and the like based on a feature of the collected fingerprint.

The touch sensor 180K is also referred to as a touch device. The touch sensor 180K may be disposed on the display 194. The touch sensor 180K and the display 194 form a touchscreen, and the touchscreen is also referred to as a touch screen. The touch sensor 180K is configured to detect a touch operation performed on or near the touch sensor 180K. The touch sensor 180K may transfer the detected touch operation to the application processor to determine a type of a touch event. Visual output related to the touch operation may be provided by using the display 194. In some other embodiments, the touch sensor 180K may alternatively be disposed on a surface of the electronic device 100 at a position different from that of the display 194.

The foregoing describes in detail the hardware system of the electronic device 100. The following describes a software system of the electronic device 100.

Figure 2:
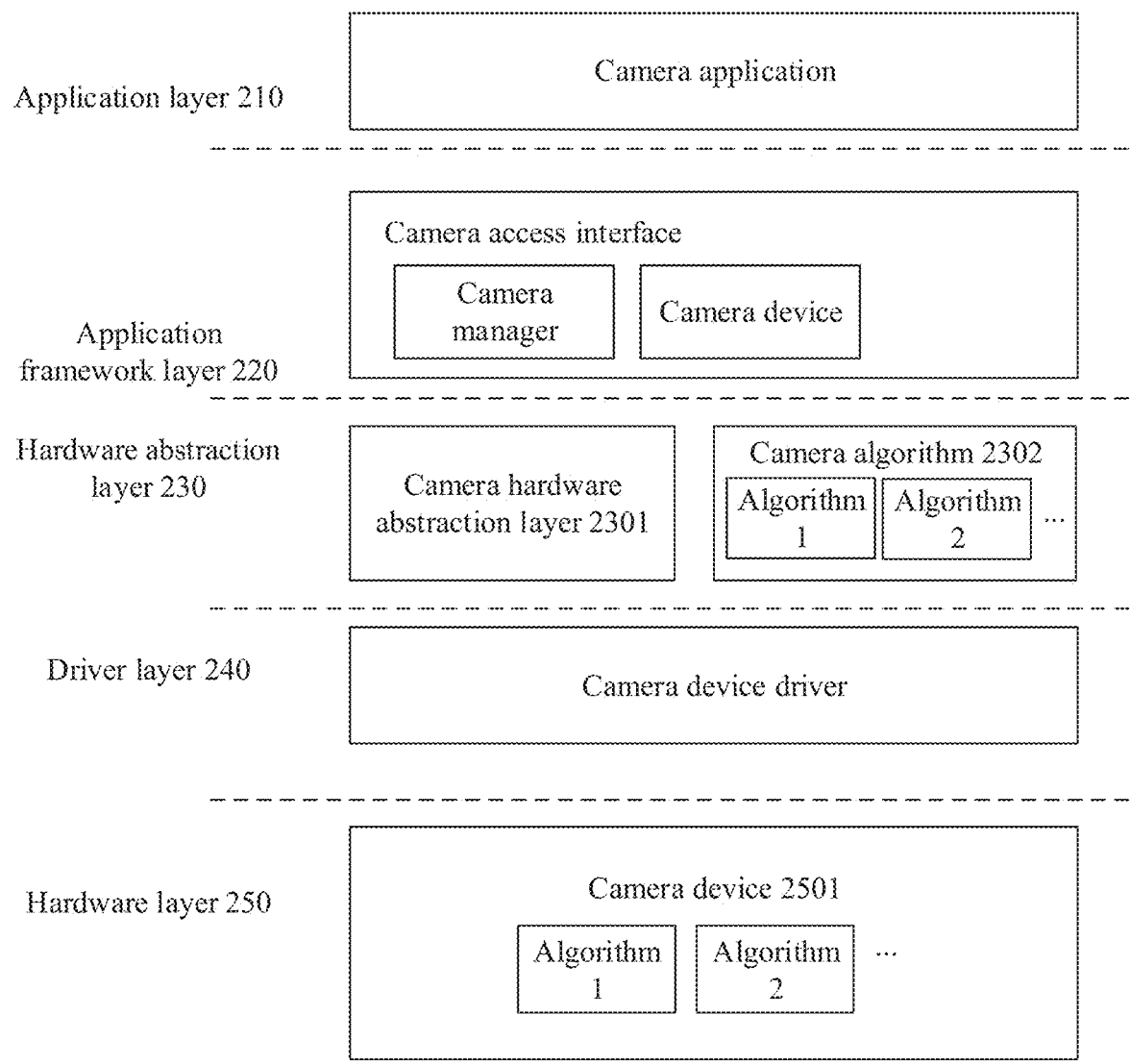
FIG. 2 is a schematic diagram of a software system of an electronic device applicable to this application.

FIG. 2 is a schematic diagram of a software system of an electronic device according to an embodiment of this application.

As shown in FIG. 2, a system architecture may include an application layer 210, an application framework layer 220, a hardware abstraction layer 230, a driver layer 240, and a hardware layer 250.

The application layer 210 may include a camera application or another application, and the another application includes but is not limited to an application such as Gallery, Calendar, Phone, Map, Navigation, WLAN, Bluetooth, Music, Video, or Messages.

The application framework layer 220 may provide an application programming interface (API) and a programming framework for the application at the application layer. The application framework layer may include some pre-defined functions.

For example, the application framework layer 220 may include a camera access interface. The camera access interface may include a camera manager and a camera device. The camera manager may be configured to provide an access interface for managing a camera. The camera device may be configured to provide an interface for accessing the camera.

The hardware abstraction layer 230 is configured to abstract hardware. For example, the hardware abstraction layer may include a camera abstraction layer 2301 and another hardware device abstraction layer. The camera hardware abstraction layer may invoke a camera algorithm.

For example, the hardware abstraction layer 230 includes the camera hardware abstraction layer 2301 and a camera algorithm 2302. The camera algorithm 2302 may include a software algorithm. For example, an algorithm 1 and an algorithm 2 may be software algorithms for image processing.

The driver layer 240 is configured to provide drivers for different hardware devices. For example, the driver layer may include a camera device driver.

The hardware layer 250 may include a camera device and another hardware device.

For example, the hardware layer 250 includes a camera device 2501. The camera device 2501 may include an algorithm, for example, the algorithm 1 and the algorithm 2.

For example, the camera device 2501 may include an image signal processor, and the algorithm in the camera device 2501 may be an image processing algorithm run in the image signal processor.

Currently, when a video is shot in a dark environment, noise of the video is relatively large because an amount of entering light is relatively small. To reduce the noise in the video and improve image quality of the video, raw-domain denoising is usually performed for an image in the video. Because operation performance and power consumption of an electronic device are limited, a size of the image needs to be reduced when raw-domain denoising is performed. To reduce the image size, currently, an image may be output in a binning manner when raw-domain denoising is performed. However, this greatly affects image definition. If downsampling is directly performed on a raw-domain image, a Bayer structure of the raw-domain image is destroyed, and consequently, the image is prone to a pseudo color after demosaicing.

In view of this, embodiments of this application provide an image processing method. An obtained raw-domain image stream is converted into an RGB-domain image stream, downsampling is performed on an image in the RGB-domain image stream to obtain a size-reduced RGB-domain image stream, and denoising is performed on the size-reduced RGB-domain image stream to obtain a noise-reduced image stream. Downsampling is performed by using the RGB-domain image stream when a size of the image stream is reduced. Therefore, image definition is not affected when the image size is reduced. In addition, performing downsampling on the RGB-domain image stream does not destroy a Bayer structure of the image, so that a pseudo color in the image can be effectively avoided. Therefore, according to the image processing method in embodiments of this application, in a case that operation performance and power consumption of an electronic device are limited, quality of an image in a video can be improved.

Application Scenario 1: Photographing Field

Figure 3A:
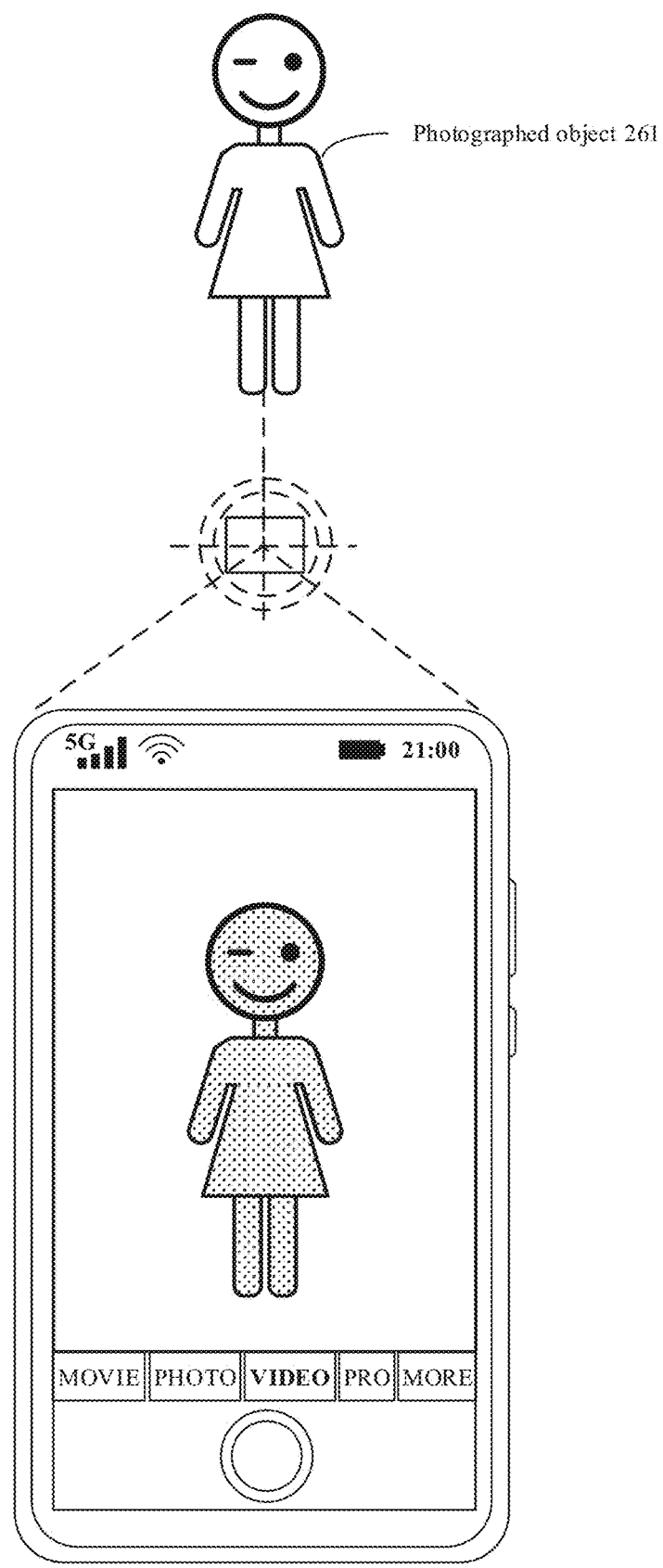
FIG. 3A and FIG. 3B are a schematic diagram of an application scenario applicable to an embodiment of this application.
Figure 3B:
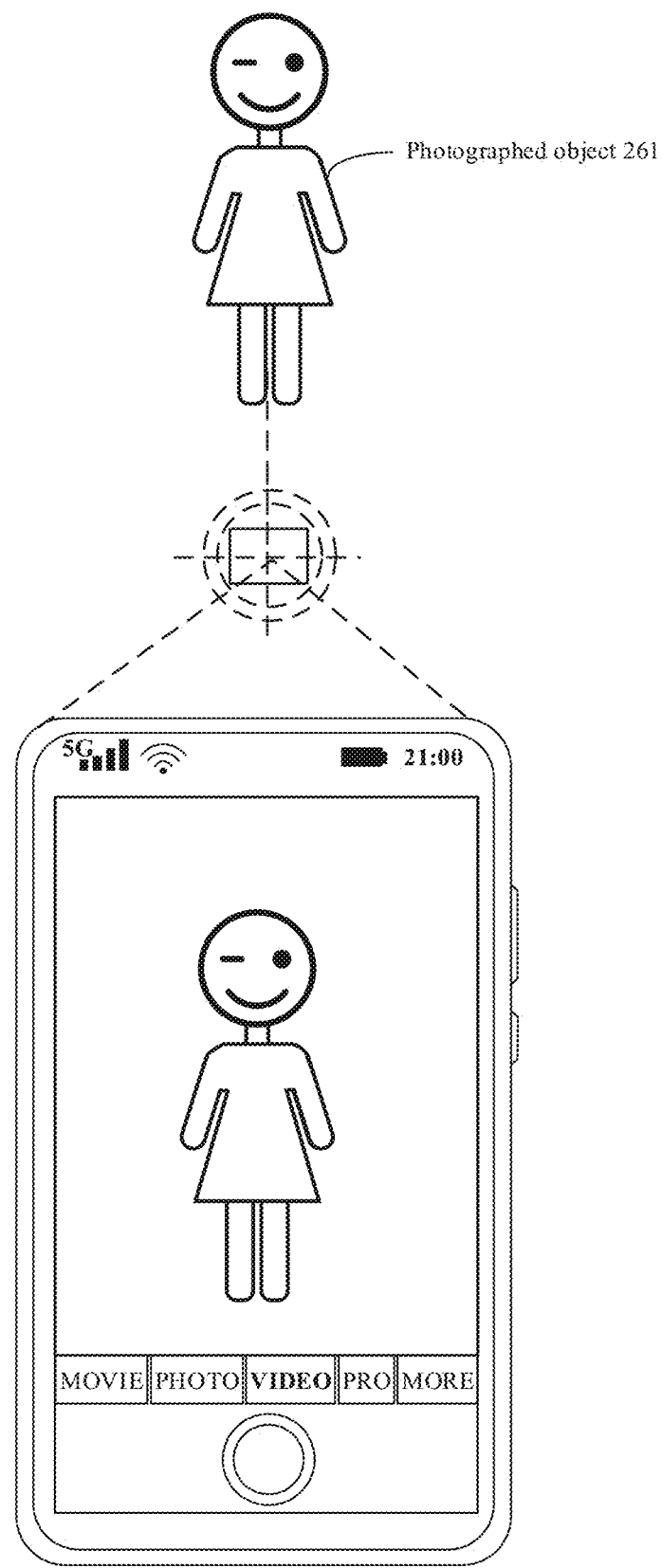

The image processing method in this application may be applied to the photographing field, for example, may be used to shoot an image or record a video in a dark scenario. As shown in FIG. 3A and FIG. 3B, when a video is recorded in a dark scenario (for example, at night), an amount of entering light of an electronic device is small, resulting in relatively large noise of an obtained image. FIG. 3A shows a preview image of a photographed object 261 that is obtained by performing image processing by using an existing solution, and FIG. 3B shows a preview image of a photographed object 261 that is obtained by using the image processing method provided in embodiments of this application. Compared with the preview image shown in FIG. 3A, the preview image shown in FIG. 3B is improved in definition. Therefore, according to the image processing method in embodiments of this application, quality of an image in a video can be improved.

Application Scenario 2: Video Call

Figure 4A:
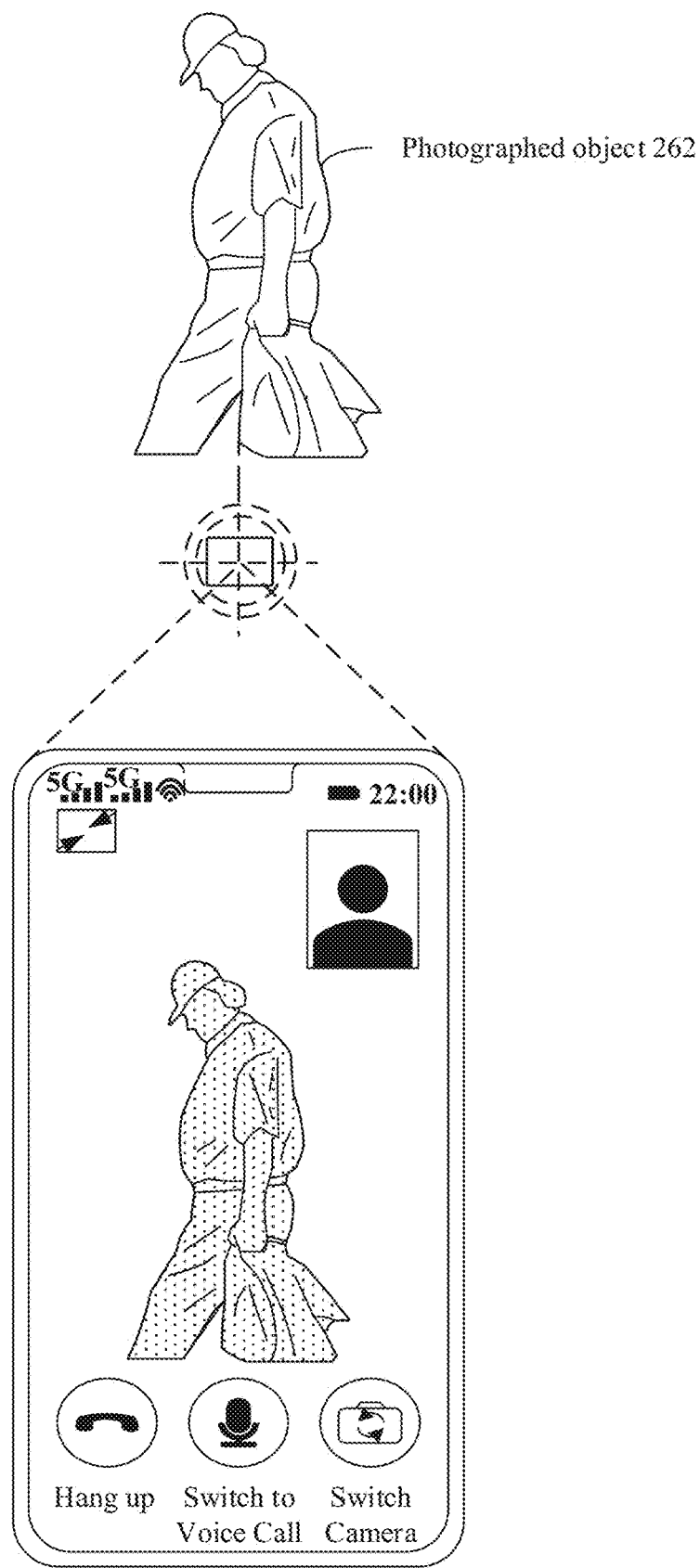
FIG. 4A and FIG. 4B are a schematic diagram of an application scenario applicable to an embodiment of this application.
Figure 4B:
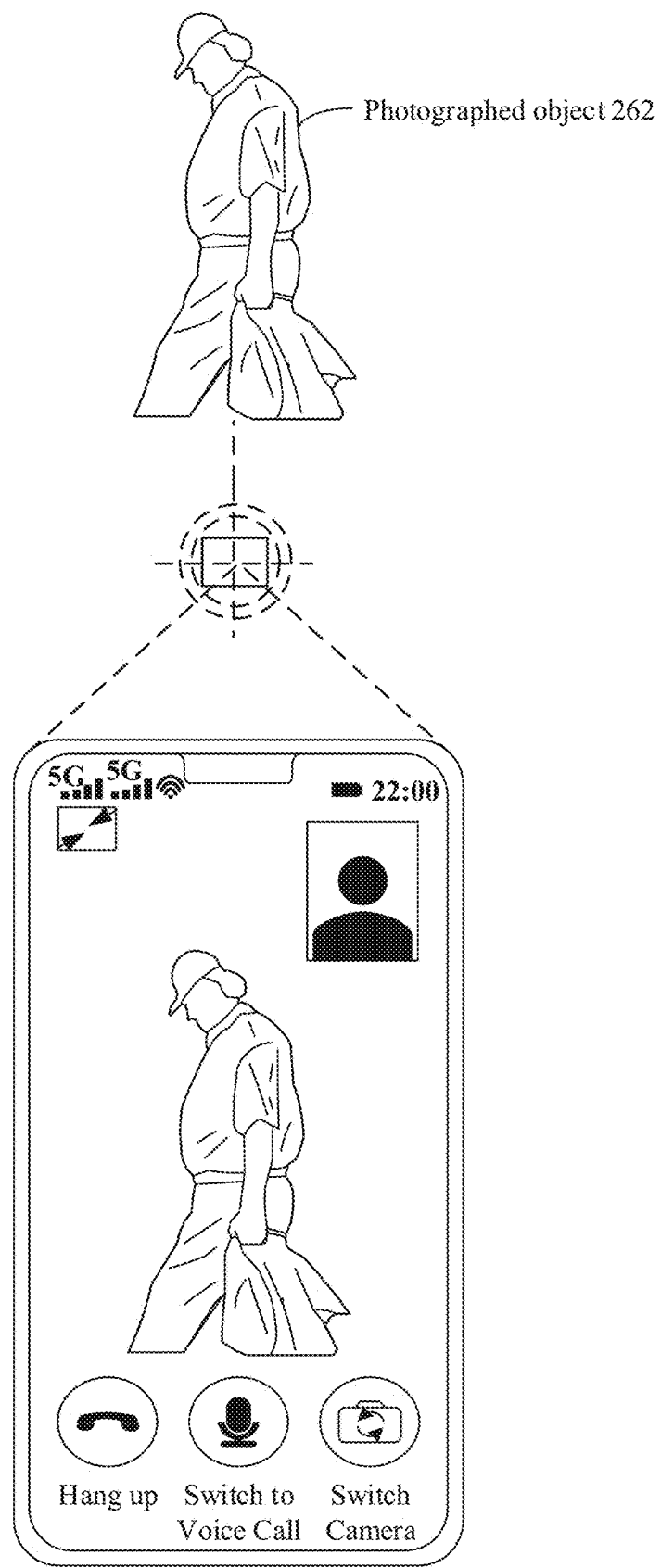

The image processing method in this application may be applied to the video call field. For example, during a video call in a dark scenario, an amount of entering light of an electronic device is small, resulting in relatively large noise of an image in the video call. As shown in FIG. 4A and FIG. 4B, FIG. 4A shows a preview image of a photographed object 262 that is obtained by performing image processing by using an existing solution, and FIG. 4B shows a preview image of a photographed object 262 that is obtained by using the image processing method provided in embodiments of this application. Compared with the preview image shown in FIG. 4A, the preview image shown in FIG. 4B is improved in definition. Therefore, according to the image processing method in embodiments of this application, quality of an image in a video can be improved.

It should be understood that noise in an image may be represented as some isolated pixels or pixel blocks that cause a relatively strong visual effect. Denoising on the image can eliminate or reduce the noise in the image, so that image quality is improved.

It should be further understood that the foregoing is an example for describing an application scenario, and constitutes no limitation on the application scenario in this application.

The following describes in detail the image processing method in embodiments of this application with reference to FIG. 5 to FIG. 10A and FIG. 10B.

Implementation 1

Figure 5:
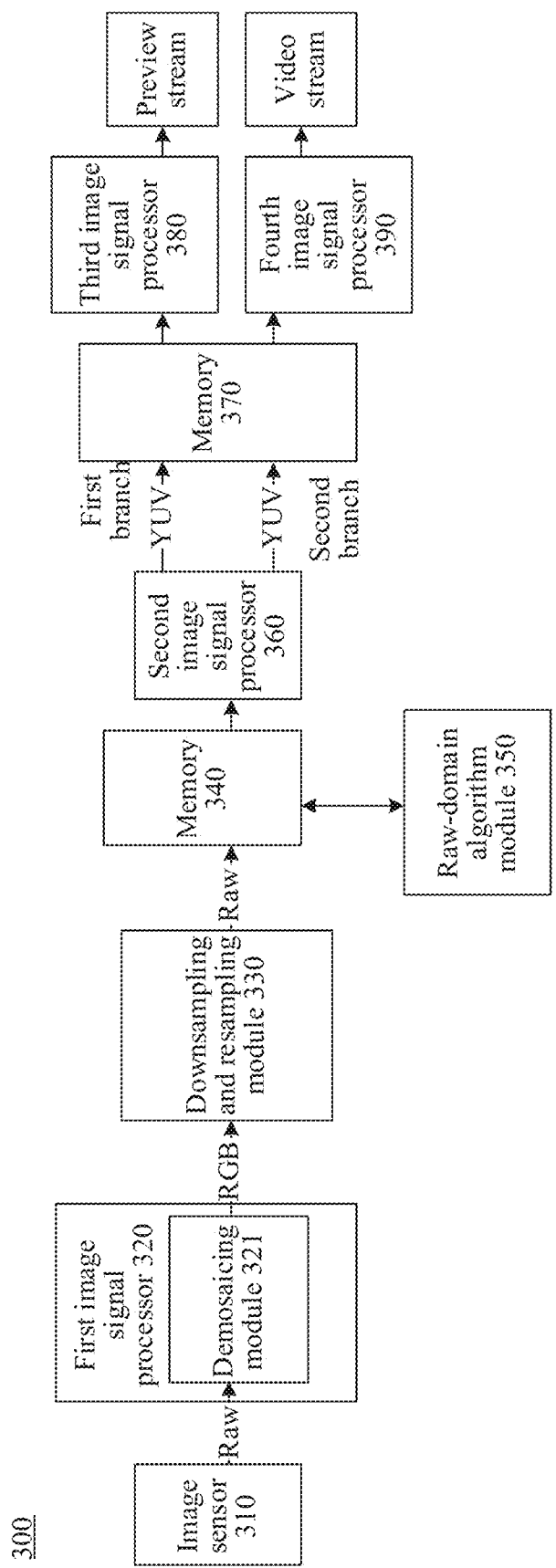
FIG. 5 is a schematic diagram of an image processing method applicable to this application.

FIG. 5 is a schematic diagram of an image processing method applicable to this application.

As shown in FIG. 5, a system 300 may include an image sensor 310, a first image signal processor 320, a downsampling and resampling module 330, a memory 340, a raw algorithm module 350, a second image signal processor 360, a memory 370, a third image signal processor 380, and a fourth image signal processor 390.

For example, the image sensor 310 is configured to capture an image or a video. Optionally, the image processor 310 may be further configured to output the image (or an image stream) or the video (or a video stream) to the first image signal processor 320.

For example, in a video recording scenario, the image sensor 310 may capture a raw-domain image stream (an example of a first image stream). A raw-domain image included in the raw-domain image stream is an image of a Bayer array structure.

For example, the first image signal processor 320 is configured to convert a captured raw-domain image into an RGB-domain image.

For example, in the video recording scenario, the first image signal processor 320 is configured to convert the raw-domain image stream into an RGB-domain image stream.

It should be understood that the raw-domain image stream is an image stream of raw color space, and the raw-domain image stream means that the image stream is in the raw color space. Similarly, the RGB-domain image stream is an image stream of RGB color space, and the RGB-domain image stream means that the image stream is in the RGB color space.

For example, the first image signal processor 320 may include a demosaicing module 321. The demosaicing module 321 may perform demosaicing on the raw-domain image stream captured by the image sensor 310, to obtain the RGB-domain image stream (an example of a second image stream).

The demosaicing may refer to converting the raw-domain image of the Bayer array structure into an RGB-domain image.

Optionally, the first image signal processor 320 may further include a defect pixel correction (DPC) module. The defect pixel correction module is configured to resolve a defect in an array including pixels of light captured on the image sensor or an error in an optical signal conversion process. A defect pixel is usually eliminated by averaging other surrounding pixels in a luminance domain.

For example, the downsampling and resampling module 330 is configured to perform downsampling (downscale) and resampling (resample) on the RGB-domain image stream that is output by the demosaicing module 321, to obtain a size-reduced raw-domain image stream. For example, downsampling may be performed on the RGB-domain image stream that is output by the demosaicing module 321 to obtain a size-reduced RGB-domain image stream, and resampling is performed on the size-reduced RGB-domain image stream to obtain the size-reduced raw-domain image stream (an example of a third image stream). The downsampling is used to reduce an image size, to meet a performance and power consumption requirement of running an algorithm. The resampling is used to convert an RGB-domain image obtained after downsampling into a raw-domain image, to obtain a size-reduced raw-domain image.

For example, the resampling may be resampling, based on a required pixel location or pixel spacing, a digital image that is formed after sampling and that includes discrete data, to form a new geometrically transformed image.

In a possible implementation, a data interface problem may exist, and consequently, neither the downsampling and resampling module 330 nor the raw-domain algorithm module 350 can directly transmit a data stream to the second image signal processor 360. Therefore, the memory 340 is configured to transmit a data stream between the downsampling and resampling module 330 and the raw-domain algorithm module 350, and transmit a data stream between the raw-domain algorithm module 350 and the second image signal processor 360.

For example, the raw-domain algorithm module 350 may perform a raw-domain algorithm on a size-reduced raw-domain image obtained from the memory 340, and the raw-domain algorithm may include but is not limited to a denoising algorithm, a super-resolution algorithm, a deblurring algorithm, or the like.

It should be understood that the raw-domain algorithm module 350 may be a software algorithm module. For example, as shown in FIG. 2, the raw-domain algorithm module 350 may be a module in a camera algorithm library. Alternatively, the raw-domain algorithm module 350 may be a hardware algorithm module. For example, as shown in FIG. 2, the raw-domain algorithm module 350 may be a module in a camera device, for example, an algorithm module in an image signal processor.

For example, the second image signal processor 360 may obtain, from the memory 340, a size-reduced raw-domain image frame processed by using the raw-domain algorithm, and perform the following processing on the size-reduced raw-domain image frame.

Step 1: Perform raw-domain algorithm processing on the size-reduced raw-domain image stream.

For example, a raw-domain algorithm in the second image signal processor 360 may include but is not limited to: black level correction (BLC), lens shading correction (LSC), auto white balance (AWB), demosaicing, or the like.

The black level correction is used to correct a black level. The lens shading correction is used to eliminate a problem that a color and brightness on the periphery of an image are inconsistent with those at a center of the image due to a lens optical system. The auto white balance is used to enable a camera to present white at any color temperature.

Step 2: Convert a processed raw-domain image stream into an RGB-domain image stream.

Step 3: Convert the RGB-domain image stream into a YUV-domain image stream, and transmit the YUV-domain image stream to the memory 370.

Optionally, in this embodiment of this application, post-processing may be further performed on the YUV-domain image stream that is output by the second image signal processor 360, and the post-processing may be used to represent other algorithm processing on the YUV-domain image stream.

Optionally, in this embodiment of this application, the YUV-domain image stream that is output by the second image signal processor 360 may be divided into a first branch and a second branch. The first branch may be used to process a preview stream and output the preview stream (an example of a fourth image stream). For example, the preview stream may be used for preview. The second branch may be used to process a video stream and output the video stream (an example of a fourth image stream). For example, the video stream may be used for video storage, playback, and the like.

In an example, as shown in FIG. 5, in a case in which running performance of an electronic device is limited, the preview stream may be an image stream obtained after a size-reduced raw-domain image stream is processed by the second image processor 360, the memory 370, and the third image signal processor 380. The size-reduced raw-domain image stream is a raw-domain image stream that is output by the downsampling and resampling module 330.

In an example, as shown in FIG. 5, in a case in which running performance of an electronic device is relatively high, the preview stream may be an image stream obtained after a size-reduced raw-domain image stream is processed by the raw-domain algorithm module 350, the second image processor 360, the memory 370, and the third image signal processor 380. The size-reduced raw-domain image stream is a raw-domain image stream that is output by the downsampling and resampling module 330.

Optionally, data stream transmission probably cannot be directly performed between the second image signal processor 360 and the third image signal processor 380 or between the second image signal processor 360 and the fourth image signal processor 390. Therefore, the second image signal processor 360 sends, through the memory 370, the output YUV-domain image stream to the third image signal processor 380 and the fourth image signal processor 390 for processing.

For example, the third image signal processor 380 may be configured to perform YUV-domain image algorithm and RGB-domain image algorithm processing on the YUV-domain image stream obtained from the memory 370 to output a preview stream. An algorithm in the third image signal processor 380 may include: a color correction matrix (CCM), gamma processing (Gamma), global tone mapping (GTM), or the like.

For example, the fourth image signal processor 390 may obtain a plurality of YUV-domain image streams from the memory 370, perform YUV-domain image algorithm and RGB-domain image algorithm processing on the YUV-domain image streams, and perform image encoding to obtain a video stream. An algorithm in the fourth image signal processor 390 may include: a color correction matrix (CCM), gamma processing (Gamma), global tone mapping (GTM), or the like.

The color correction matrix is used to calibrate accuracy of a color other than white. The gamma processing is used to adjust brightness, contrast, a dynamic range, and the like of an image by adjusting a gamma curve. The global tone mapping is used to resolve a problem that grayscale value distribution of a high dynamic range image is uneven.

Optionally, the memory 370 and the memory 340 may refer to different memory locations occupied in same memory hardware.

In an example, as shown in FIG. 5, there may further be a first image stabilization algorithm module 391 between the memory 370 and the third image signal processor 380, and there may further be a second image stabilization algorithm module 392 between the memory 370 and the fourth image signal processor 390. The first image stabilization algorithm module 391 and the second image stabilization algorithm module 392 may have different image stabilization algorithms. The first image stabilization algorithm module 391 is configured to perform image stabilization on an image in the preview stream, and an image stabilization algorithm may lead to no image delay, to ensure "what you see is what you get" for a user. The second image stabilization algorithm module 392 is configured to perform image stabilization on an image in the video stream, and an image stabilization algorithm may be buffered and processed by using an image, to achieve a better image stabilization effect.

Figure 6:
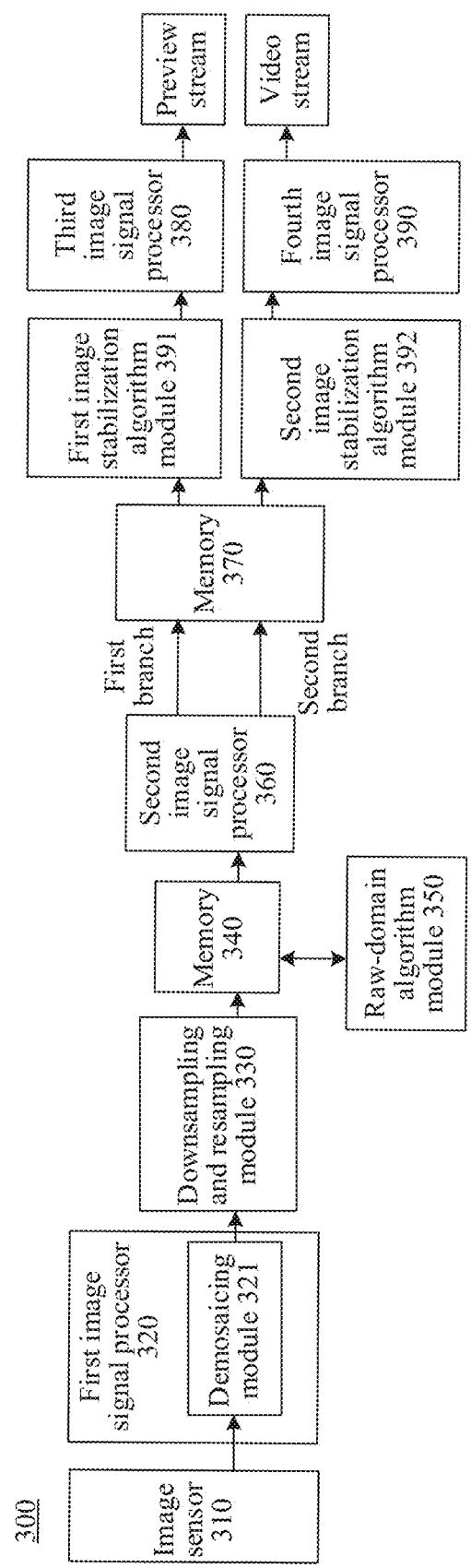
FIG. 6 is a schematic diagram of an image processing method applicable to this application.

Optionally, in a high-frame-rate photographing scenario, to improve performance and reduce power consumption of the electronic device, the first branch and the second branch shown in FIG. 5 or FIG. 6 may be combined into one branch for outputting a video stream.

Optionally, as shown in FIG. 5, the first image signal processor 320 and the second image signal processor 360 may be different image signal processors, and the third image signal processor 380 and the fourth image signal processor 390 may be a same image signal processor.

Optionally, an image signal processor may be divided into two parts. One part performs raw-domain algorithm processing, and is denoted as ISP-part1. The other part performs YUV-domain and/or RGB-domain algorithm processing, and is denoted as ISP-part2. As shown in FIG. 5, the first image signal processor 320 may refer to first part1, and the second image signal processor 360 may refer to second part1. First part1 and second part1 may be different part1 in a same image signal processor, or first part1 and second part1 may be part1 in different image signal processors. The third image signal processor 380 may refer to first part2, and the fourth image signal processor 390 may refer to second part2. First part2 and second part2 may be part2 in a same image signal processor.

For example, image processing algorithms run in the first image signal processor 320, the second image signal processor 360, the third image signal processor 380, and the fourth signal processor 390 may be algorithms in the camera device 2501 shown in FIG. 2. Image processing algorithms run in the downsampling and resampling module 330, the memory 340, the raw-domain algorithm module 350, and the memory 370 may be algorithms in the camera algorithm library 2302 shown in FIG. 2.

Optionally, in a possible implementation, as shown in FIG. 5, the downsampling and resampling module 330 and the memory 340 may transmit data streams to each other. In other words, the downsampling and resampling module 330 may transmit a size-reduced raw-domain image to the memory 340. Similarly, when there is an algorithm requirement, a data stream in the memory 340 may also be transmitted to the downsampling and resampling module 330 for processing.

Optionally, in a possible implementation, as shown in FIG. 5, the second image signal processor 360 and the memory 370 may transmit data streams to each other, the memory 370 and the third image signal processor 380 may transmit data streams to each other, and the memory 370 and the fourth image signal processor 390 may transmit data streams to each other.

For example, the image sensor 310 may capture a raw image (for example, a 4K raw image), and an RGB image (for example, a 4K RGB image) is output after the raw image is processed by the first image signal processor 320. The downsampling and resampling module 330 processes the RGB image to obtain a raw image (for example, an FHD*1.44-sized raw image, where FHD is short for full high definition). The raw image may be transmitted to the raw-domain algorithm module 350 through the memory 340. After the raw image is processed by the raw-domain algorithm module 350, a raw image with enhanced image quality may be obtained (for example, image quality enhancement may include denoising, super-resolution, or deblurring). The raw image with enhanced image quality is transmitted to the memory 340. The memory 340 may transmit the raw image with enhanced image quality to the second image signal processor 360 for processing (for example, gamma processing or 3D LUT processing), to output a YUV image (for example, an FHD*1.44-sized YUV image). The memory 370 may transmit the YUV image to the third image signal processor 380 or the fourth image signal processor 390 for processing, to obtain a preview stream or a video stream.

Embodiments of this application provide the image processing method. An obtained raw-domain image stream is converted into an RGB-domain image stream, downsampling and resampling are performed on an image in the RGB-domain image stream to obtain a size-reduced RGB-domain image stream, and image processing is performed on the size-reduced RGB-domain image stream to obtain a processed image stream. Downsampling is performed by using the RGB-domain image stream when a size of the image stream is reduced. Therefore, image definition is not affected when the image size is reduced. In addition, performing downsampling on the RGB-domain image stream does not destroy a Bayer structure of the image, so that a pseudo color in the image can be effectively avoided. Therefore, according to the image processing method in embodiments of this application, in a case that operation performance and power consumption of an electronic device are limited, quality of an image in a video can be improved.

Implementation 2

Figure 7:
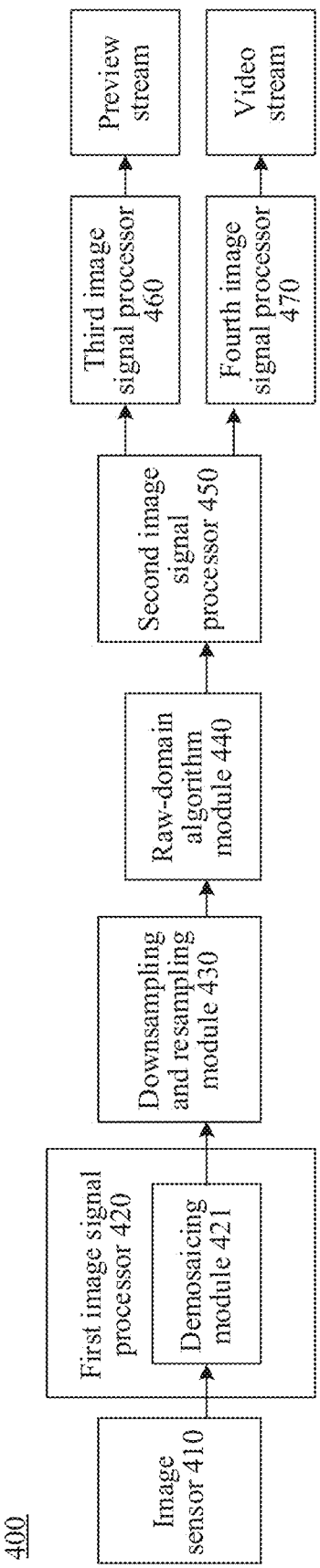
FIG. 7 is a schematic diagram of an image processing method applicable to this application.

In an example, an image signal processor may directly transmit a data stream with a software algorithm module, or when different parts of an image signal processor can directly transmit a data stream, data stream transmission may not require a memory in an electronic device, as shown in FIG. 7.

FIG. 7 is a schematic diagram of an image processing method applicable to this application.

As shown in FIG. 7, a system 400 may include an image sensor 410, a first image signal processor 420, a downsampling and resampling module 430, a raw algorithm module 440, a second image signal processor 450, a third signal processor 460, and a fourth signal processor 470, and the first image signal processor 420 includes a demosaicing module 421. As shown in FIG. 6, the raw-domain algorithm module 440 can directly transmit a data stream to the second image signal processor 450. Therefore, the raw algorithm module 440 may not need to transmit a data stream to the second image signal processor 450 through a memory. In addition, a data stream can also be directly transmitted between the second image signal processor 450 and the third image signal processor 460, and between the second image signal processor 450 and the fourth image signal processor 470. The second image signal processor 450 does not need to transmit a data stream to the third image signal processor 460 and the fourth image signal processor 470 through a memory.

It should be noted that for a part in FIG. 7 that is the same as that in FIG. 5 or FIG. 6, refer to the descriptions in FIG. 5 or FIG. 6. Details are not described herein again.

Implementation 3

Figure 8:
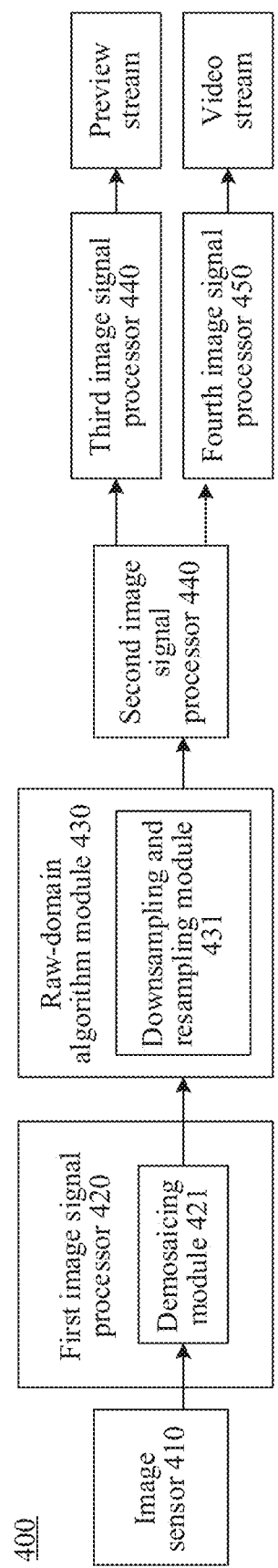
FIG. 8 is a schematic diagram of an image processing method applicable to this application.

Optionally, in a possible implementation, as shown in FIG. 8, a raw algorithm module 440 may include a downsampling and resampling module 431.

It should be noted that for a part in FIG. 8 that is the same as that in FIG. 5 or FIG. 6, refer to the descriptions in FIG. 5 or FIG. 6. Details are not described herein again.

Figure 9:
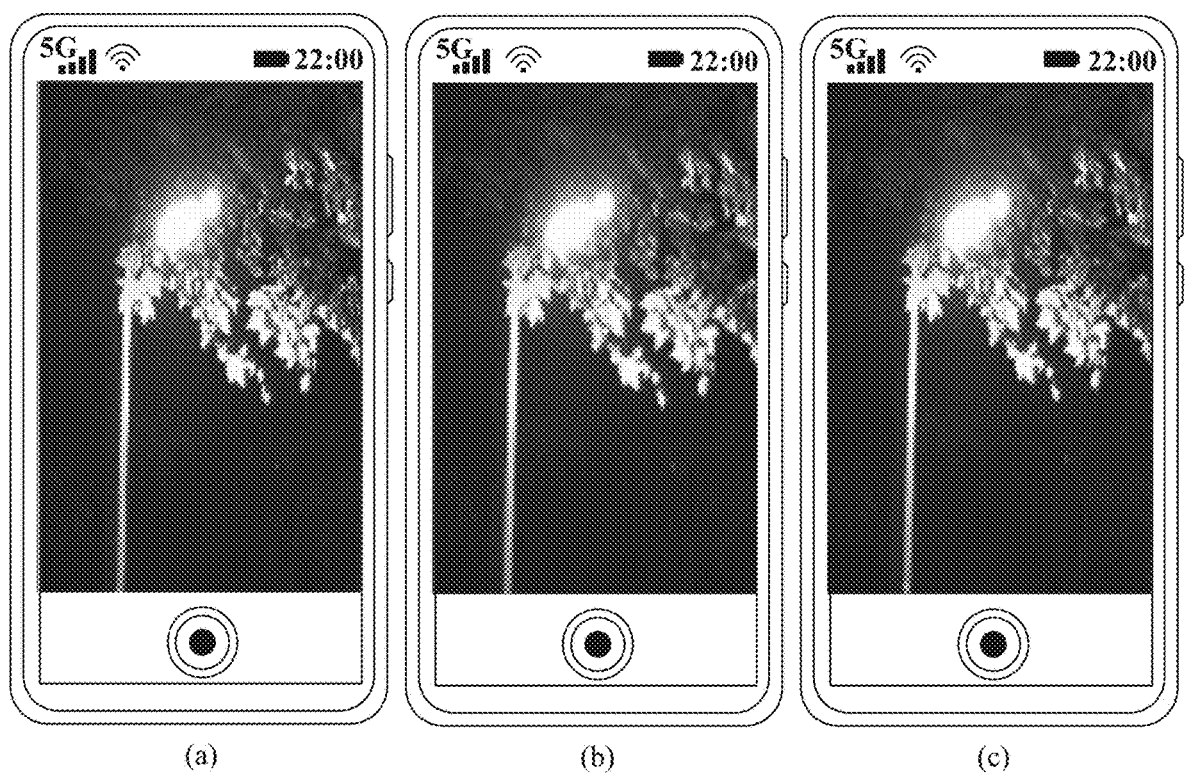
FIG. 9 is a schematic diagram of an effect of an image processing method according to an embodiment of this application.

FIG. 9 is a schematic diagram of denoising effects of different image processing methods according to an embodiment of this application.

(a) in FIG. 9 shows an output image obtained by performing denoising after downsampling is directly performed on a raw-domain image, (b) in FIG. 9 shows an output image obtained in a v2h2 binning manner after denoising is performed on a raw-domain image, and (c) in FIG. 9 shows an output image obtained by using an image processing method provided in embodiments of this application. Compared with the output image shown in (c) in FIG. 9, the output image shown in (a) in FIG. 9 has a pseudo color, and the image shown in (b) in FIG. 9 has lower definition. Therefore, compared with an existing solution, the image processing method provided in embodiments of this application can improve a denoising effect and improve image quality when denoising is performed on an image.

In an example, a night mode may be enabled in a camera application on an electronic device. In a scenario in which the electronic device recognizes that an amount of entering light is relatively small in a current photographing environment, denoising is performed, according to the image processing method provided in embodiments of this application, on a raw-domain image captured by a sensor, to output a preview stream and/or a video stream obtained after denoising.

Figure 10A:
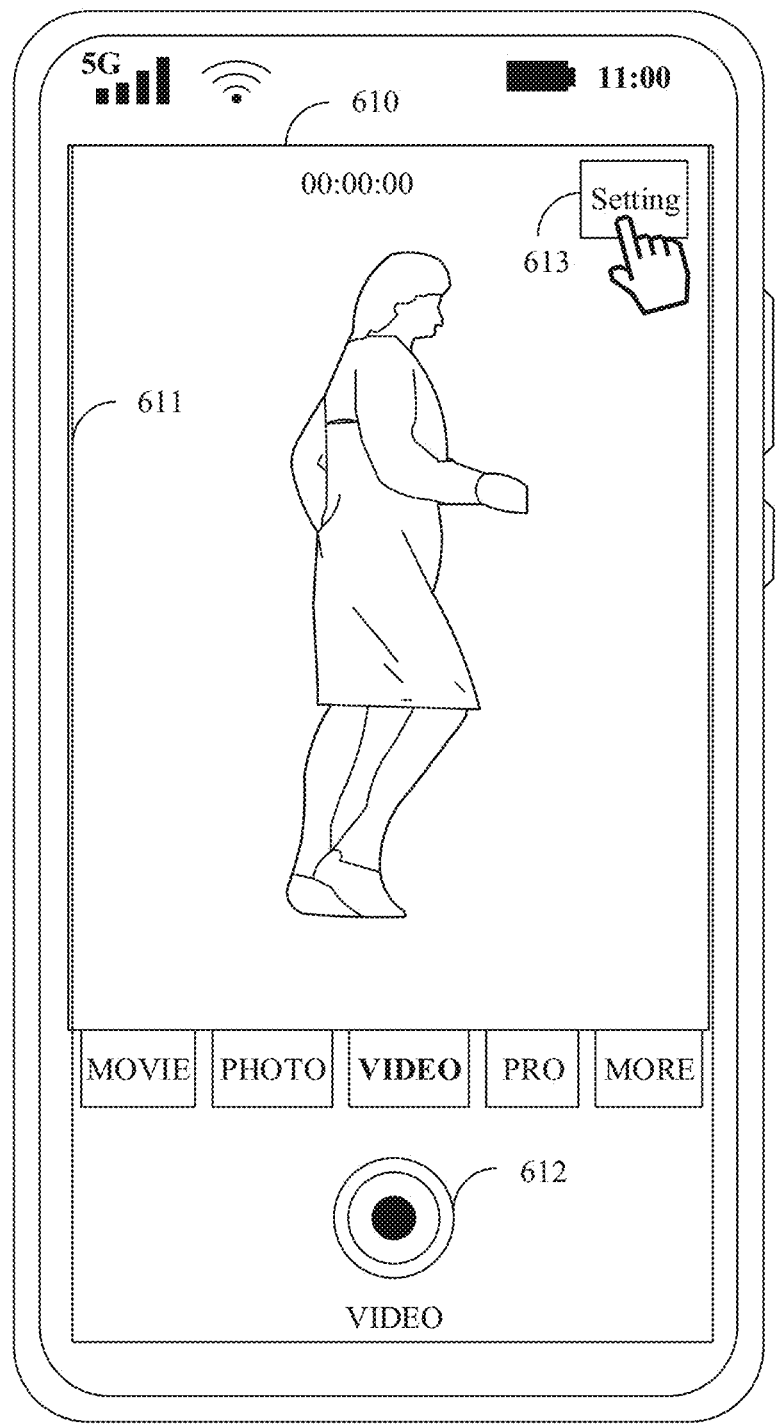
FIG. 10A and FIG. 10B are a schematic diagram of a display interface of an electronic device according to an embodiment of this application.
Figure 10B:
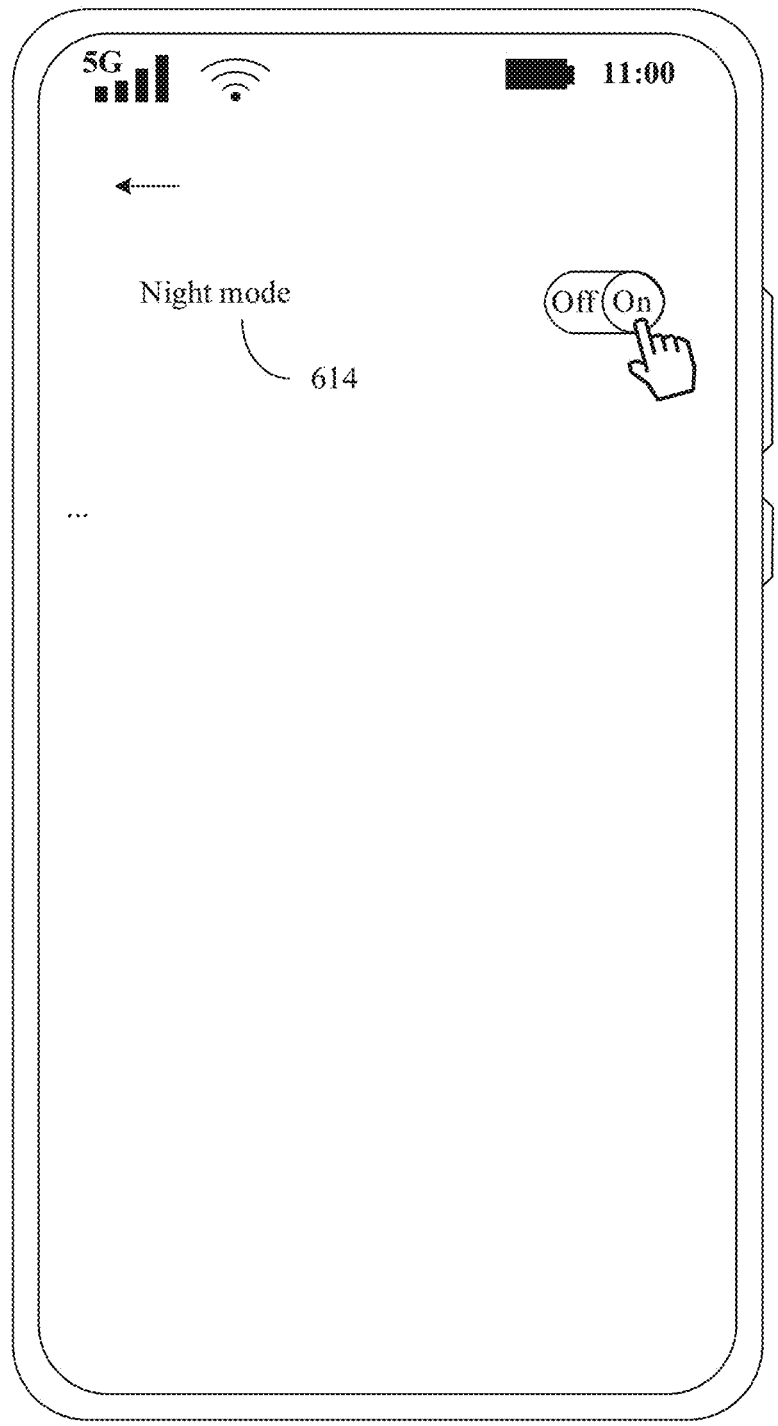

For example, FIG. 10A and FIG. 10B show a graphical user interface (GUI) of an electronic device. A GUI shown in FIG. 10A may be a display interface of a camera application in a video mode, and the display interface may include a photographing interface 610. The photographing interface 610 may include a viewfinder 611 and a control. For example, the viewfinder 611 may include a control 612 used to indicate video recording and a control 613 used to indicate setting. An operation of tapping the control 613 by a user is detected, and a setting interface is displayed in response to the user operation, as shown in (b) in FIG. 9. The setting interface includes a night mode 614, and it is detected that the user enables the night mode (an example of a second operation). After the electronic device enables the night mode, denoising may be performed, according to the image processing method provided in embodiments of this application, on an image stream captured by the electronic device.

The foregoing describes in detail the image processing method in embodiments of this application with reference to FIG. 1 to FIG. 10A and FIG. 10B. The following describes apparatus embodiments of this application in detail with reference to FIG. 11 and FIG. 12. It should be understood that an apparatus in embodiments of this application may perform the foregoing methods in embodiments of this application. In other words, for a specific working process of the following products, refer to a corresponding process in the foregoing method embodiments.

Figure 11:
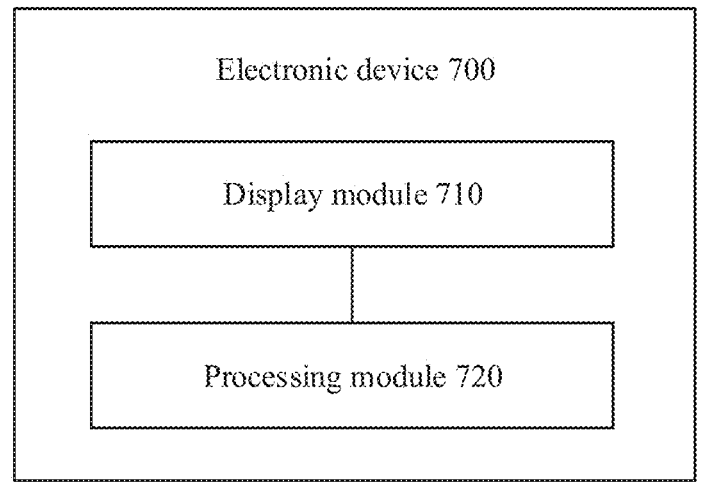
FIG. 11 is a schematic diagram of a structure of an electronic device according to an embodiment of this application.

FIG. 11 is a schematic diagram of a structure of an electronic device according to an embodiment of this application. The electronic device 700 includes a display module 710 and a processing module 720.

The display module 710 is configured to display a first interface, where the first interface includes a first control. The processing module 720 is configured to: detect a first operation on the first control; obtain a first image stream in response to the first operation, where the first image stream is an image stream of first color space; convert the first image stream into a second image stream of second color space according to a demosaicing algorithm; perform downsampling and resampling on the second image stream to obtain a third image stream, where the third image stream is an image stream of the first color space, and a size of the third image stream is less than that of the first image stream; and perform image processing on the third image stream to obtain a fourth image stream.

Optionally, in an embodiment, the image processing includes processing according to an algorithm of the first color space, and the algorithm of the first color space includes at least one of the following algorithms:

a denoising algorithm, a super-resolution algorithm, or a deblurring algorithm.

Optionally, in an embodiment, the processing module 720 is further configured to:

store the fourth image stream, where the fourth image stream is used for playback.

Optionally, in an embodiment, the fourth image stream is a preview image stream.

Optionally, in an embodiment, the electronic device includes a camera algorithm library, the camera algorithm library is set at a hardware abstraction layer, and the camera algorithm library includes an algorithm used for the downsampling, an algorithm used for the resampling, or the algorithm of the first color space.

Optionally, in an embodiment, the processing module 720 is further configured to:

detect a second operation, where the second operation is used to indicate to enable a night mode of the electronic device, and the night mode is a photographing mode in which an amount of entering light of the electronic device is less than a preset threshold.

Optionally, in an embodiment, the first interface is a home screen of the electronic device, the home screen includes a camera application, and the first control is a control corresponding to the camera application.

Optionally, in an embodiment, the first interface is a video recording interface, and the first control is a control used to indicate video recording.

Optionally, in an embodiment, the first interface is a video call interface, and the first control is a control used to indicate video calling.

It should be noted that the foregoing electronic device 700 is embodied in a form of a functional module. The term "module" herein may be implemented in a form of software and/or hardware. This is not specifically limited.

For example, the "module" may be a software program, a hardware circuit, or a combination thereof that implements the foregoing functions. The hardware circuit may include an application-specific integrated circuit (ASIC), an electronic circuit, a memory and a processor (such as a shared processor, a dedicated processor, or a group of processors) configured to execute one or more software or firmware programs, a combined logic circuit, and/or another suitable component that supports the described function.

Therefore, the example units described in embodiments of this application can be implemented by using electronic hardware or a combination of computer software and electronic hardware. Whether the functions are implemented by hardware or software depends on specific applications and design constraints of the technical solutions. A person skilled in the art may use different methods for each specific application to implement the described functions, but this implementation should not be considered to be beyond the scope of this application.

Figure 12:
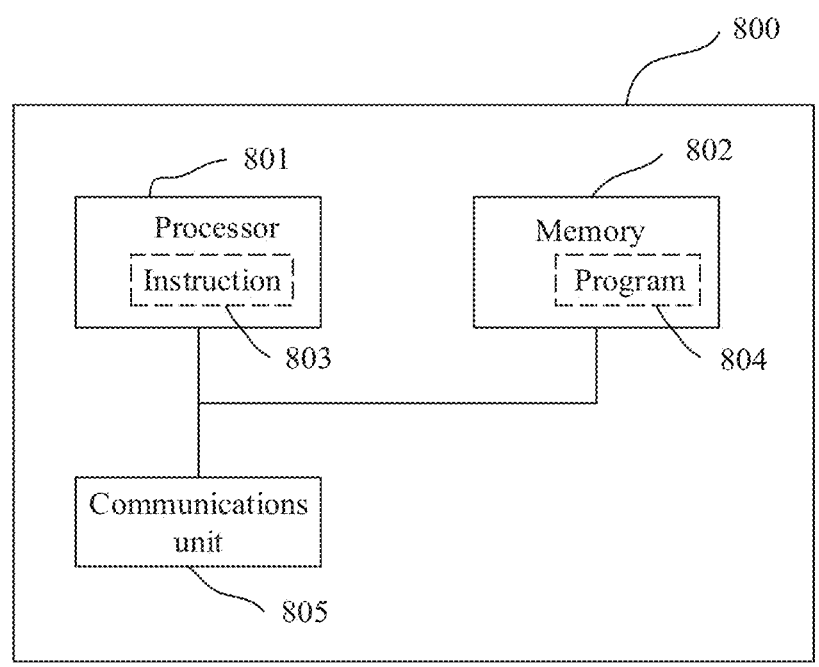
FIG. 12 is a schematic diagram of a structure of an electronic device according to an embodiment of this application.

FIG. 12 is a schematic diagram of a structure of an electronic device according to this application. A dashed line in FIG. 12 indicates that the unit or the module is optional.

The electronic device 800 may be configured to implement the method described in the foregoing method embodiments.

The electronic device 800 includes one or more processors 801, and the one or more processors 801 may support the electronic device 800 in implementing the image processing method in the method embodiment. The processor 801 may be a general-purpose processor or a dedicated processor. For example, the processor 801 may be a central processing unit (CPU), a digital signal processor (DSP), an application-specific integrated circuit (ASIC), a field programmable gate array (FPGA), or another programmable logic device, such as a discrete gate, a transistor logic device, or a discrete hardware component.

The processor 801 may be configured to control the electronic device 800, execute a software program, and process data of the software program. The electronic device 800 may further include a communications unit 805, configured to implement signal input (receiving) and output (sending).

For example, the electronic device 800 may be a chip, the communications unit 805 may be an input and/or output circuit of the chip, or the communications unit 805 may be a communications interface of the chip, and the chip may be used as a part of a terminal device or another electronic device.

For another example, the electronic device 800 may be a terminal device, and the communications unit 805 may be a transceiver of the terminal device, or the communications unit 805 may be a transceiver circuit of the terminal device.

The electronic device 800 may include one or more memories 802, storing a program 804. The program 804 may be run by the processor 801 to generate an instruction 803, so that the processor 801 performs the image processing method in the foregoing method embodiments according to the instruction 803.

Optionally, the memory 802 may further store data. Optionally, the processor 801 may further read the data stored in the memory 802, where the data may be stored in a same storage address as the program 804, or the data may be stored in a different storage address from the program 804.

The processor 801 and the memory 802 may be disposed separately, or may be integrated together, for example, integrated onto a system on a chip (SOC) of a terminal device.

For example, the memory 802 may be configured to store the related program 804 of the image processing method provided in embodiments of this application. When performing image processing, the processor 801 may be configured to invoke the related program 804 of the image processing method that is stored in the memory 802 to perform the image processing method in embodiments of this application, for example, perform the following operations: displaying a first interface, where the first interface includes a first control; detecting a first operation on the first control; obtaining a first image stream in response to the first operation, where the first image stream is an image stream of first color space; converting the first image stream into a second image stream of second color space according to a demosaicing algorithm; performing downsampling and resampling on the second image stream to obtain a third image stream, where the third image stream is an image stream of the first color space, and a size of the third image stream is less than that of the first image stream; and performing image processing on the third image stream to obtain a fourth image stream.

This application further provides a computer program product. When the computer program product is executed by the processor 801, the image processing method in any method embodiment of this application is implemented.

The computer program product may be stored in the memory 802, for example, may be the program 804. The program 804 undergoes processing processes such as pre-processing, compilation, assembly, and link, and is finally converted into an executable target file that can be executed by the processor 801.

This application further provides a computer-readable storage medium, storing a computer program. When the computer program is executed by a computer, the image processing method in any method embodiment of this application is implemented. The computer program may be a high-level language program, or may be an executable target program.

The computer-readable storage medium is, for example, the memory 802. The memory 802 may be a volatile memory or a non-volatile memory, or the memory 802 may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), which serves as an external cache. By way of example and not limitation, many forms of RAMs are available, such as a static random access memory (static RAM, SRAM), a dynamic random access memory (dynamic RAM, DRAM), a synchronous dynamic random access memory (synchronous DRAM, SDRAM), double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for convenience and brevity of description, for a specific working process and an achieved technical effect of the foregoing described apparatus and device, refer to a corresponding process and technical effect in the foregoing method embodiments, and details are not described herein again.

In the several embodiments provided in this application, the disclosed system, apparatus, and method may be implemented in other manners. For example, some features of the method embodiments described above may be ignored or not performed. The described apparatus embodiments are merely examples. Division into the units is merely logical function division. In actual implementation, there may be another division manner. A plurality of units or components may be combined or integrated into another system. In addition, a coupling between units or a coupling between components may be a direct coupling, or may be an indirect coupling. The coupling includes an electrical, mechanical, or another form of connection.

It should be understood that in embodiments of this application, sequence numbers of processes do not mean a sequence of execution. The sequence of execution of the processes should be determined according to functions and internal logic of the processes, and should not constitute any limitation on an implementation process of embodiments of this application.

In addition, the terms "system" and "network" are usually used interchangeably in this specification. The term "and/or" in this specification is merely an association relationship of associated objects, and indicates that three relationships may exist. For example, A and/or B may indicate the following three cases: Only A exists, both A and B exist, and only B exists. In addition, the character "/" in this specification usually indicates an "or" relationship between the associated objects.

In conclusion, the foregoing descriptions are merely example embodiments of the technical solutions of this application, and are not intended to limit the protection scope of this application. Any modification, equivalent replacement, or improvement made without departing from the spirit and principle of this application should fall within the protection scope of this application.

What is claimed is:

1. An image processing method, the method comprising:
    displaying, by an electronic device, a first interface, wherein the first interface comprises a first control;
    detecting, by the electronic device, a first operation on the first control;
    obtaining, by the electronic device, a first image stream in response to the first operation, wherein the first image stream is an image stream of first color space;
    converting, by the electronic device, the first image stream into a second image stream of second color space according to a demosaicing algorithm;
    performing, by the electronic device, downsampling and resampling on the second image stream to obtain a third image stream, wherein the third image stream is an image stream of the first color space, and a size of the third image stream is less than that a size of the first image stream; and
    performing, by the electronic device, image processing on the third image stream to obtain a fourth image stream.

2. The image processing method according to claim 1, wherein the image processing comprises processing according to an algorithm of the first color space, and the algorithm of the first color space comprises at least one of the following algorithms:
    a denoising algorithm, a super-resolution algorithm, or a deblurring algorithm.

3. The image processing method according to claim 1, further comprising:
    storing the fourth image stream, wherein the fourth image stream is used for playback.

4. The image processing method according to claim 1, wherein the fourth image stream is a preview image stream.

5. The image processing method according to claim 2,
    wherein the electronic device comprises a camera algorithm library;
    wherein the camera algorithm library is set at a hardware abstraction layer; and
    wherein the camera algorithm library comprises an algorithm used for the downsampling, an algorithm used for the resampling, or the algorithm of the first color space.

6. The image processing method according to claim 1, further comprising:
    detecting, by the electronic device, a second operation, wherein the second operation is used to enable a night mode of the electronic device, and the night mode is a photographing mode in which an amount of entering light of the electronic device is less than a preset threshold.

7. The image processing method according to claim 1, wherein the first interface is a home screen of the electronic device, the home screen comprises a camera application, and the first control is a control corresponding to the camera application.

8. The image processing method according to claim 1, wherein the first interface is a video recording interface, and the first control is a control used to indicate video recording.

9. The image processing method according to claim 1, wherein the first interface is a video call interface, and the first control is a control used to indicate video calling.

10. An electronic device, comprising:
one or more processors; and
a memory that is coupled to the one or more processors, wherein the memory is configured to store computer program code, the computer program code comprises computer instructions, and the one or more processors invoke the computer instructions, so that the electronic device performs the following steps:
displaying a first interface, wherein the first interface comprises a first control;
detecting a first operation on the first control;
obtaining a first image stream in response to the first operation, wherein the first image stream is an image stream of first color space;
converting the first image stream into a second image stream of second color space according to a demosaicing algorithm;
performing downsampling and resampling on the second image stream to obtain a third image stream, wherein the third image stream is an image stream of the first color space, and a size of the third image stream is less than a size of the first image stream; and
performing image processing on the third image stream to obtain a fourth image stream.

11. The electronic device according to claim 10, wherein the image processing comprises processing according to an algorithm of the first color space, and
the algorithm of the first color space comprises at least one of the following algorithms: a denoising algorithm, a super-resolution algorithm, or a deblurring algorithm.

12. The electronic device according to claim 10, wherein the one or more processors invoke the computer instructions so that the electronic device further performs the following step:
storing the fourth image stream, wherein the fourth image stream is used for playback.

13. The electronic device according to claim 10, wherein the fourth image stream is a preview image stream.

14. The electronic device according to claim 11, further comprising:
a camera algorithm library;
wherein the camera algorithm library is set at a hardware abstraction layer; and
wherein the camera algorithm library comprises an algorithm used for the downsampling, an algorithm used for the resampling, or the algorithm of the first color space.

15. The electronic device according to claim 10, wherein the one or more processors invoke the computer instructions so that the electronic device further performs the following step:
detecting a second operation, wherein the second operation is used to enable a night mode of the electronic device, and the night mode is a photographing mode in which an amount of entering light of the electronic device is less than a preset threshold.

16. The electronic device according to claim 10, wherein the first interface is a home screen of the electronic device, the home screen comprises a camera application, and the first control is a control corresponding to the camera application.

17. The electronic device according to claim 10, wherein the first interface is a video recording interface, and the first control is a control used to indicate video recording.

18. The electronic device according to claim 10, wherein the first interface is a video call interface, and the first control is a control used to indicate video calling.

19. The electronic device according to claim 10, wherein the first color space refers to a raw domain, and the second color space comprises an RGB domain or a YUV domain.

20. A non-transitory computer-readable storage medium that stores a computer program, such that when the computer program is executed by a processor, the processor is enabled to perform the following steps:
displaying a first interface, wherein the first interface comprises a first control;
detecting a first operation on the first control;
obtaining a first image stream in response to the first operation, wherein the first image stream is an image stream of first color space;
converting the first image stream into a second image stream of second color space according to a demosaicing algorithm;
performing downsampling and resampling on the second image stream to obtain a third image stream, wherein the third image stream is an image stream of the first color space, and a size of the third image stream is less than a size of the first image stream; and
performing image processing on the third image stream to obtain a fourth image stream.

* * * * *

UNITED STATES PATENT AND TRADEMARK OFFICE
CERTIFICATE OF CORRECTION

| | | |
|---|---|---|
| PATENT NO. | : 12,407,944 B2 | Page 1 of 1 |
| APPLICATION NO. | : 18/009858 | |
| DATED | : September 2, 2025 | |
| INVENTOR(S) | : Wang et al. | |

It is certified that error appears in the above-identified patent and that said Letters Patent is hereby corrected as shown below:

In the Claims

Claim 1, Column 20, Line 33: "third image stream is less than that a size of the first" should read
-- third image stream is less than a size of the first --.

Signed and Sealed this
Fourteenth Day of October, 2025

John A. Squires
*Director of the United States Patent and Trademark Office*